3,267,150
Patented August 16, 1966

3,267,150
SULFONE PRODUCTION
Harold W. Moore, Menlo Park, and Frederick F. Rust, Orinda, Calif., assignors to Shell Oil Company, New York, N.Y., a corporation of Delaware
No Drawing. Filed Aug. 12, 1963, Ser. No. 301,663
18 Claims. (Cl. 260—607)

This invention relates to a novel process for the production of sulfones, and to the novel compounds produced thereby. More particularly, it relates to the addition of sulfonyl halides to conjugated dienes and to the novel halosulfones thus produced.

Numerous methods are available for the production of sulfones. Typical of these are the oxidation of a sulfide to the corresponding sulfone with hydrogen peroxide or an inorganic oxidizing agent, and the sulfonation of aromatic hydrocarbons with sulfonic acids or sulfonyl halides under Friedel-Crafts conditions. Such methods are limited by the availability of the sulfide reactant in the first instance, and the limited applicability of the reaction process in the second instance. The available processes are generally suitable for the production of dihydrocarbyl sulfones, but have limited utility in the production of sulfones possessing additional reactive substituents.

It is an object of the present invention to provide a novel method for the production of sulfones and the novel sulfones obtained thereby. A further object is to provide a novel class of sulfones possessing additional reactive substituents that enable the sulfone to be employed as a reactant in further synthetic operations. An additional object is to provide a process for the conjugate addition of a sulfonyl halide to a 1,3-diene system to produce a novel class of sulfones.

It has now been found that these objects are accomplished by the process of reacting a sulfonyl halide with a conjugated diene in the presence of certain metallic compounds as catalysts to produce a δ-halo-β-alkenyl sulfone as a 1,4-addition product. By "alkenyl" herein is meant otherwise unsubstituted hydrocarbenyl and substituted hydrocarbenyl.

The compounds which have been found to be useful catalysts for the process of the invention are copper compounds, particularly salts comprising copper cations, either in the cuprous or cupric valence state, and simple anions, inorganic or organic. Although copper compounds such as the oxide, carbonate, acetate, sulfate and the like are operable, best results are obtained when the catalyst employed is a halide, e.g., fluoride, chloride, bromide or iodide. Preferred are copper halides wherein the the halogen has an atomic number from 17 to 35, that is, the middle halogens, chloride and bromine. Although cuprous salts are generally preferred over the corresponding cupric salt, in most cases cupric salts give satisfactory results. Particularly preferred as catalyst for the process of the invention is cuprous chloride.

The copper compounds are employed in catalytic amounts. While the optimum amount of catalyst will depend upon the particular copper compound, sulfonyl halide and diene employed, amounts of catalyst from about 0.005 mole to about 0.5 mole per mole of limiting reactant are generally satisfactory, while amounts of catalyst from about 0.05 mole to about 0.2 mole per mole of limiting reagent are preferred.

The sulfonyl halide reactant is a mono- or poly-halosulfonated organic compound. Preferred sulfonyl halides are represented by the formula R$(SO_2X)_n$ wherein R is a mono- to n-valent organic, preferably hydrocarbon, radical having up to 40 carbon atoms, X represents halogen and $n$ is a whole number from 1 to 6 inclusive.

The organic moiety, R of the sulfonyl halide reactant, is aliphatic, including acyclic and alicyclic, or aromatic, and is substituted with from 1 to 6 sulfonyl halide substituents. R is a hydrocarbon radical, that is, contains only carbon and hydrogen, or is a substituted-hydrocarbon radical, with non-hydrocarbon substituents such as halogen, nitro, dihydrocarbylamino, hydrocarbylsulfonyl, sulfo, hydrocarbylsulfonyloxy, acylamino, hydrocarbylsulfonamido, acyl, hydrocarbyloxy and the like. Preferred substituents are non-reactive with the sulfonyl halide function, although the reaction process may be conducted in the presence of groups equivalent to reactive substituents, e.g., amino and hydroxyl, if such substituents are protected furing the formation and reaction of the sulfonyl halide by conventional methods such as acylation, esterification, etherification and the like. Subsequent to reaction with the diene, such protective groups are removed to produce products that would be produced from reaction of sulfonyl halides substituted with reactive groups. In addition, although less preferred for reasons of the diminished reactivity thereof, R is suitably a hydrocarbyl or substituted hydrocarbyl moiety which serves as a monomer in a halosulfonated polymeric or co-polymeric material, e.g., a halosulfonated ethylene monomer in a polyethylene or ethylene-propylene polymer. Preferred R groups are those having from 1 to 20 carbon atoms and from 1 to 3 sulfonyl halide substituents.

The term X in the above-depicted formula represents halogen, that is, fluorine, chlorine, bromine and iodine, and sulfonyl fluorides, sulfonyl chlorides, sulfonyl bromides and sulfonyl iodides are operable in the process of the invention. Within a sulfonyl halide molecule possessing more than one sulfonyl halide radical, all X substituents may be the same or two or more X groups may represent different halogens. Preferred, however, are sulfonyl halides wherein all X groups, if more than one sulfonyl halide radical is present, represent the same halogen. Preferred sulfonyl halide reactants are those wherein the halogen has an atomic number of from 17 to 35, i.e., the middle halogens, bromine and chlorine, and optimum results are obtained when the sulfonyl halide is a sulfonyl chloride.

Aliphatic sulfonyl halides suitable as reactants are those wherein the sulfonyl halide radical is attached to an aliphatic carbon atom. The aliphatic moiety may be alkyl, alkenyl or alkynyl, although it is generally preferred that the sulfonyl halide contain no non-aromatic carbon-carbon unsaturation. Illustrative of alkyl and aralkyl sulfonyl halides are methanesulfonyl chloride, methanedisulfonyl chloride, methanetrisulfonyl bromide, ethanesulfonyl chloride, propanesulfonyl iodide, hexanesulfonyl fluoride, 1,2-ethanedisulfonyl chloride, 2-propanesulfonyl fluoride, 1,1-ethanedisulfonyl chloride, β-phenylethanesulfonyl iodide, phenylmethanesulfonyl bromide, 1,5-pentanedisulfonyl chloride, 1,2,6-hexanetrisulfonyl bromide, and the like; while alkenesulfonyl halides are exemplified by 3-butenesulfonyl chloride and 6-heptenesulfonyl bromide, and alkynesulfonyl halide reactants include 4-hexynesulfonyl chloride. Also satisfactory are aliphatic sulfonyl halides possessing non-hydrocarbyl substituents such as 3-chlorobutanesulfonyl chloride, 5-carbethoxypentanesulfonyl fluoride, 3-dimethylamino-2-methylbutanesulfonyl chloride and the like.

Cycloaliphatic sulfonyl halides suitable as reactants include hydrocarbyl sulfonyl halides such as cyclohexanesulfonyl chloride, cyclopentanesulfonyl chloride, 1,4-cyclohexanedisulfonyl bromide, tetrahydronaphthalene-1,8-disulfonyl iodide, 2-methylcyclohexanesulfonyl fluoride, 3-cyclohexenesulfonyl chloride, 2,3-diethylcyclopentanesulfonyl iodide, 4-octylcyclohexanesulfonyl chloride and 3-phenylcyclopentanesulfonyl bromide; as well as substituted hydrocarbyl sulfonyl halides such as 3-chlorocyclohexanesulfonyl chloride, 1,4-(2-diethylaminocyclohexane)disulfonyl bromide, 3-carbomethoxycyclopentanesulfonyl chloride, and 4-methylsulfonylcycloheptanesulfonyl bromide.

Aromatic sulfonyl halide reactants have from 1 to 6 aromatic rings which are fused or non-fused, but preferably have from 1 to 2 aromatic rings. Exemplary aromatic sulfonyl halides include benzenesulfonyl chloride, benzenedisulfonyl chloride, p-toluenesulfonyl chloride, m-bromobenzenesulfonyl bromide, p-chlorobenzenesulfonyl chloride, p-tert-butylbenzenesulfonyl iodide, 1-naphthalenesulfonyl fluoride, 1,4-naphthalenedisulfonyl chloride, m-nitrobenzenesulfonyl chloride, 4-chlorosulfonylphenyl methanesulfonate, p-methoxybenzenesulfonyl fluoride, 2,4-dimethylbenzenesulfonyl chloride, N-methyl-N-ethylsulfonyl-p-chlorosulfonylaniline, bis(4-chlorosulfonylphenyl)methane, and di(3-bromosulfonylphenyl).

Most preferred are mono- to disulfonyl halides wherein the organic moiety is aliphatic having from 1 to 10 carbon atoms or mono-nuclear aromatic having from 6 to 10 carbon atoms.

The sulfonyl halides are prepared by conventional methods, as by halosulfonation of a hydrocarbon or conversion of the corresponding sulfonic acid to the sulfonyl halide by treatment with an inorganic halogen compound, e.g., thionyl halide.

The sulfonyl halide is reacted with a conjugated diene. The diene moiety is contained in an acyclic, alicyclic or heterocyclic structure, preferably having from 4 to 20 carbon atoms, possesses terminal or internal olefinic linkages, or both, and contains hydrogen, hydrocarbyl or substituted hydrocarbyl substituents upon the basic four-carbon diene structure. Preferred conjugated dienes are represented by the formula

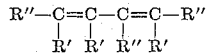

wherein R' and R'' independently are hydrogen, aliphatic or aromatic radicals, with the further proviso that an R'' may together with an R' form a divalent radical having from 0 to 8 carbon atoms and from 0 to 1 atom selected from the group of oxygen, sulfur and nitrogen.

Illustrative of conjugated dienes are butadiene, isoprene, chloroprene, 2,3-dimethylbutadiene, 1,3-hexadiene, 2,4-heptadiene, 2-methoxy-1,3-butadiene, 2,3-dibromo-1,3-pentadiene, 2,5-dimethyl-4-ethyl-1,3-hexadiene, 1,3,5-hexatriene, 4-bromo-1,3-pentadiene, 1,4-dicarbethoxy-1,3-butadiene, 3,5-decadiene, 3,5-hexadienyl methyl ketone, 2,5-diphenyl-2,4-hexadiene, 2,3-dicarbethoxy-1,3-butadiene, 5-acetoxy-1,3-pentadiene, 1-naphthyl-1,3-butadiene and 1-(4-methoxyphenyl)-3,5-octadiene. Exemplary conjugated cyclic diense are those diense wherein at least one carbon atom of at least one olefinic linkage is a portion of a carbocyclic ring, such as 1,3-cyclohexadiene, cyclopentadiene, 2-methyl-1,3-cyclohexadiene, 4-chlorocyclopentadiene, 5,5-diphenylcyclopentadiene, 1-vinylcyclohexene, cycloheptatriene, hexachlorocyclopentadiene, 3-methylenecyclopentene, 1,3-cyclooctadiene, 1,2-dimethylenecyclohexane, 4-acetoxy-1,3-cyclohexadiene, 3,5-dipropyl-1,3-cyclohexadiene, 5-fluoro-1,3-cyclohexadiene, 5-hexylsulfonyl-1,3-cyclohexadiene, 1,1-bis(2,4-cyclohexadienyl), dicyclohexenyl, dicyclopentenyl and 1-vinyl-4-dimethylaminocyclohexene. Heterocyclic conjugated dienes include 3-vinyl-4,5-dihydro-2H-pyran, N-methyl-3-methylenedihydropyrrole and the like.

Preferred conjugated dienes, however, are acyclic dienes having from 4 to 10 carbon atoms and carbocyclic dienes having from 5 to 10 carbon atoms. When the conjugated diene is acyclic, it is further preferred that the diene have from 4 to 8 carbon atoms, be a hydrocarbon diene or a holahydrocarbon diene, and have at least one terminal olefinic linkage.

The sulfonyl halide and diene reactants may be employed in any convenient ratio, as an excess of either does not appear to be detrimental. Suitable ratios will of course depend upon the functionality of the sulfonyl halide, that is, the number of sulfonyl halide groups present in the reactant molecule, as a polysulfonyl halide molecule may react with more than one molecule of diene if sufficient diene is present. Molar ratios of sulfonyl halide group to diene from about 5:1 to about 1:5 are satisfactory although ratios of from about 2:1 to about 1:2 are preferred. Frequently, satisfactory results are obtained when the reactants are employed in quantities that are substantially stoichiometric, that is, a molar ratio of sulfonyl halide group to conjugated diene of about 1:1.

The process of the invention is conducted in liquid phase solution. Solvents that are suitable are liquid at reaction temperature and pressure, are capable of dissolving the reactants, and are substantially inert towards the sulfonyl halide and diene reactants as well as the sulfones produced therefrom. Preferred solvents for the process of the invention are polar, that is, contain uneven charge distribution. Illustrative solvents include the ethers, e.g., acyclic ethers such as diethyl ether, dibutyl ether, and hexyl methyl ether, and lower alkyl ethers (full) of ethylene glycol, diethylene glycol, tetraethylene glycol, glycerol and 1,2,6-hexanetriol wherein the alkyl groups have from 1 to 4 carbon atoms, as well as cyclic ethers such as dioxane, tetrahydropyran, tetrahydrofuran and dioxolane; the nitriles such as acetonitrile, propionitrile and butyronitrile; sulfones such as dimethyl sulfone, diethyl sulfone, propyl hexyl sulfone, diphenyl sulfone and sulfolane; and N,N-dialkylamides such as dimethylformamide and N,N-diethylacetamide. Preferred solvents are the nitriles, and particularly preferred is acetonitrile.

The addition reaction is conducted over a wide range of temperatures. Temperatures from about room temperature, e.g., 20° C., up to the decomposition temperature of the reactants, catalyst or reaction products are in general satisfactory, although temperatures above about 200° C. offer little advantage. Temperatures from about 50° C. to about 150° C. are preferred. The reaction process is conducted at atmospheric, subatmospheric or superatmospheric pressure. Particularly convenient pressures are those pressures generated by the reactants at reaction temperature in a sealed reaction vessel. Such pressures will normally be somewhat but not greatly higher than atmospheric pressure.

The process of the invention is preferably conducted under substantially anhydrous conditions, as moisture, if present, hydrolyzes a portion of the sulfonyl halide, thereby lowering the product yield. However, small amounts of water, e.g., up to 1–2% of the reaction mixture, may be tolerated without losing the advantages of the process.

The reaction of the sulfonyl halide with the diene may be conducted by adding one reactant to the other in the presence of solvent and copper-containing catalyst, as by passing the diene into a mixture of sulfonyl halide, catalyst and solvent, although it is equivalently useful to initially mix the entire amounts of reactants, catalyst and solvent. Following reaction, the desired sulfone is recovered from the reaction mixture by conventional means, such as by fractional distillation, fractional crystallization or the like.

The novel products of the invention are sulfones containing as one substituent of the sulfone group a δ-halo-β-alkenyl moiety. These products result from conjugate addition of at least one R—SO₂— and X-moieties of the sulfonyl halide to the 1,3-diene and are represented by the formula

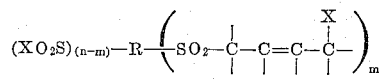

wherein R, n and X have the previously stated significance, and m is a whole number from 1 to n inclusive. When such products are derived from the preferred diene reactants, they are represented by the formula

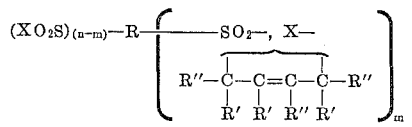

wherein R, R', R", n, m and X have the previously stated significance. Preferred are the compounds wherein all sulfonyl halide radicals of the sulfonyl halide reactant have reacted with diene, i.e., the compound of the above-depicted formula wherein $n=m$. Illustrative of the process of the invention and the products produced thereby are the following reactions:

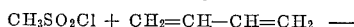
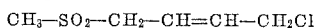
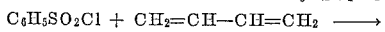
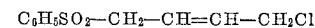
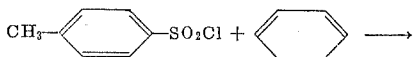
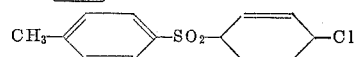
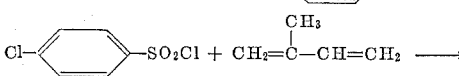
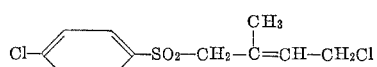

Other representative products include 4-chloro-2-heptenyl propyl sulfone, 4-bromo-4-methyl-2-pentenyl p-dimethylaminophenyl sulfone, 1,4-bis(4-chloro-2-butenylsulfonyl) benzene, 4-iodo-2-cyclopentenyl methyl sulfone, 4 - bromo - 2 - ethyl-2-butenyl 4-bromosulfonyl-2-bromophenyl sulfone, 4-chloro-1-propyl-2-heptenyl naphthyl sulfone, 4-chloro-2-butenyl cyclohexyl sulfone, 4-fluoro-2-hexenyl 2-fluorosulfonylethyl sulfone, tris(4-chloro-2-butenyl) methane, 4-iodo-2-butenyl p-methoxyphenyl sulfone, 4-chloro-2,4-dipropyl-2-heptenyl amyl sulfone, 2,3,4-trichloro-2-butenyl propyl sulfone, 2,4-dibromocyclohexene p-fluorophenyl sulfone, 4,5-dichloro-2-pentenyl phenyl sulfone, 2 - chloromethylcyclohexenyl ethyl sulfone, 2-bromocyclohexylidenemethyl cyclohexyl sulfone, 4-chloro-4-phenyl-2-butenyl phenyl sulfone, 4-bromo-2-cyclooctenyl butyl sulfone, N-methyl-3(2-chloroethylidine)-2-tetrahydropyrryl methyl sulfone, 4-bromo-2-butenyl cycloheptyl sulfone and 4-chloro-5-phenyl-2-pentenyl m-(N,N-dimethylsulfonylamino) phenyl sulfone. The preferred class of sulfone products comprises halohydrocarbon sulfones.

The novel unsaturated halosulfone products of the invention find utility in the area of agricultural chemicals wherein they are employed as germicides, fungicides and the like. As the product molecule contains an active halogen and olefinic unsaturation, the compounds are suitable for use as chemical intermediates. Reaction of the allylic halogen with tertiary amines produces useful quaternary ammonium halides, or alternatively, reaction with alkoxides and phenoxides produces ethers, reaction with carboxylic acids or salts thereof produces esters, while reaction with sodium hydrosulfide produces the corresponding thiol compound. The olefinic linkage is employed as a reactive site for homopolymerization of the product molecule, or alternatively the unsaturated halosulfones are polymerized with other olefinic molecules. The carbon-carbon double bond is epoxidized to the corresponding epoxy derivative, from which useful epoxy resins are produced by treatment with conventional curing agents. The epoxide is also reacted with water to produce the diol, with hydrogen sulfide to produce the hydroxymercaptan and with organic hydroxylic compounds on salts thereof to produce hydroxy-esters or hydroxy-ethers. In addition, products wherein the alpha-carbon atom of the δ-halo-β-alkenyl moiety possesses a hydrogen substituent may be dehydrohalogenated to produce a sulfonyl-substituted diene.

To further illustrate the novel process of the invention and the novel products thereof, the following examples are provided. It should be understood that they are not to be regarded as limitations, as the teachings thereof may be varied as will be understood by one skilled in this art.

*Example I*

In a glass ampule whose volume approximated 50 ml. were mixed 5.7 g. (0.05 mole) of methanesulfonyl chloride, 2.5 g. (0.05 mole) of 1,3-butadiene, 0.5 g. of cuprous chloride and 10 ml. of acetonitrile. The tube was evacuated and sealed while cooled in a liquid nitrogen bath. The reaction mixture was heated at 70° C. for 2 hours and then at 85° C. for 1.5 hours, at the end of which time the reaction mixture was dark brown. The tube was opened and washed with water to give a colorless organic layer. Volatile components of the reaction mixture were removed by evaporation at room temperature. The residual solid was recrystallized from ethanol to give 4.2 g. of a white crystalline solid, M.P. 48–50° C. The infrared spectrum indicated the presence of sulfone group and carbon-carbon double bond. The nuclear magnetic resonance spectrum confirmed the product structure as methyl 4-chloro-2-butenyl sulfone.

|  | Anal. Calc. for C$_5$H$_9$SO$_2$Cl | Found |
| --- | --- | --- |
| C, percent weight | 35.6 | 35.8 |
| H, percent weight | 5.3 | 5.4 |
| Cl, percent weight | 21.0 | 21.0 |

The yield of product was essentially quantative based upon a 51% conversion.

Similar results were obtained when cupric chloride rather than cuprous chloride was employed as catalyst.

*Example II*

In a glass ampule were mixed 5 g. (0.027 mole) of p-toluenesulfonyl chloride, 1.8 g. (0.027 mole) of isoprene, 0.5 g. of cuprous chloride and 10 ml of acetonitrile. The tube was evacuated and sealed, and allowed to stand overnight at room temperature. The reaction mixture was then heated at 75° C. for 2 hours. The reaction mixture was cooled, the ampule opened and the contents washed with water, whereupon a white solid formed. The precipitate was filtered and recrystallized from ethanol to give a white crystalline solid, M.P. 86–88° C. The infrared and nmr spectra were in agreement with the structure p-tolyl 4-chloro-2-methyl-2-butenyl sulfone.

|  | Anal. Calc. C$_{12}$H$_{15}$SO$_2$Cl | Found |
| --- | --- | --- |
| C, percent weight | 55.6 | 55.5 |
| H, percent weight | 5.7 | 5.8 |
| Cl, percent weight | 13.7 | 14.3 |

The yield of product, based upon a conversion of 74%, was essentially quantitative.

*Example III*

In a glass ampule were mixed 5 g. (0.027 mole) of p-toluenesulfonyl chloride, 2.4 g. (0.03 mole) of 1,3-cyclohexadiene, 0.5 g. of cuprous chloride and 10 ml. of acetonitrile. The tube was evacuated and sealed and then heated at 80° C. for 3 hours. The reaction mixture, initially dark brown, gave a water white organic layer upon washing with distilled water. The organic layer was dried over anhydrous magnesium sulfate and allowed to stand in an open evaporating dish for three hours, during which time crystallization occurred. The solid was recrystallized from anhydrous ethanol to give 5.9 g. of a white crystalline solid, M.P. 88–91° C. The infrared and nmr spectra indicate the structure of the product to be p-tolyl 4-chloro-2-cyclohexenyl sulfone.

| | Anal. Calc. for C₁₃H₁₃SO₂Cl | Found |
|---|---|---|
| C, percent weight | 58.2 | 57.5 |
| H, percent weight | 4.8 | 5.6 |
| Cl, percent weight | 13.0 | 12.9 |

The yield of product was essentially quantitative based upon a conversion of 80%.

Example IV

In a glass ampule were mixed 5 g. (0.028 mole) of benzenesulfonyl chloride, 1.6 g. (0.03 mole) of 1,3-butadiene, 0.5 g. of cuprous chloride and 10 ml. of acetonitrile. The tube was evacuated, sealed and heated at 80° C. for 2 hours. The dark brown reaction mixture was washed with distilled water to give a colorless organic layer which upon cooling, yielded 3.5 g. of a white solid. The solid was recrystallized from anhydrous ethanol to give a crystalline solid, phenyl 4-chloro-2-butenyl sulfone, M.P. 38–39° C., which was identified by infrared and nuclear magnetic resonance spectra. A nearly quantitative yield of product based upon a 62% conversion was obtained.

Example V

Into a glass ampule were placed 5 g. (0.028 mole) of benzenesulfonyl chloride, 1.9 g. (0.030 mole) of isoprene, 0.5 g. of cuprous chloride and 10 ml. of acetonitrile. The ampule was evacuated, cooled in a liquid nitrogen bath, and sealed. The reaction mixture was heated at 80° C. for 3 hours, after which time the ampule was cooled, opened, and washed with distilled water to yield a crystalline solid. Recrystallization from ethanol gave 3.5 g. of a white crystalline solid, M.P. 67–69° C. The structure of the product was confirmed by infrared and nmr analysis as being phenyl 4-chloro-2-methyl-2-butenyl sulfone. A nearly quantitative yield of product, based upon a 51% conversion, was obtained.

Example VI

Five grams (0.024 mole) of p-chlorobenzenesulfonyl chloride, 1.6 g. (0.03 mole) of isoprene, 0.5 g. of cuprous chloride and 10 ml. of acetonitrile were mixed in a glass ampule. The ampule was cooled, evacuated and sealed. The reaction mixture was heated for 3 hours at 80° C., and after the ampule was cooled and opened, washed with distilled water. The solid produced thereby was recrystallized twice from absolute ethanol to give 3.9 g. of a white crystalline solid, M.P. 84–86° C., which infrared and nmr analysis showed to be p-chlorophenyl 4-chloro-2-methyl-2-butenyl sulfone. Based upon a conversion of 60%, a nearly quantitative yield of product was obtained.

Example VII

To a 300 ml. autoclave were charged 50 g. (0.182 mole) m-benzenedisulfonyl chloride, 19.7 g. (0.364 mole) butadiene, 150 ml. of acetonitrile and 3.6 g. of cuprous chloride. The contents were heated at 85° C. for 5 hours while the reactor was rocked. Upon cooling, the entire contents appeared solid. The recrystallized product, 1,3-bis(4-chloro-2-butenylsulfonyl)benzene, had the following analysis.

| | Calc. for C₁₄H₁₆O₄Cl₂S₂ | Found |
|---|---|---|
| C, percent weight | 44.0 | 44.0 |
| H, percent weight | 4.2 | 4.3 |
| Cl, percent weight | 18.6 | 18.3 |
| S, percent weight | 16.7 | 16.7 |

Example VIII

When cyclohexanesulfonyl bromide is reacted with 2,3-dimethylbutadiene in dimethylformamide solution in the presence of cupric bromide, a good yield of 4-bromo-2,3-dimethyl-2-butenyl cyclohexyl sulfone is obtained.

Example IX

Following a procedure similar to that of Example I, when 5-methoxy-1-naphthalenesulfonyl iodide is reacted with butadiene in the presence of cuprous hydroxide as a catalyst in dimethoxyethane solution, a good yield of 4-iodo-2-butenyl 5-methoxy-1-naphthyl sulfone is obtained.

Example X

When methanesulfonyl fluoride is reacted with 1,2-dimethylenecyclohexane in acetonitrile soluiton in the presence of cupric acetate catalyst, a good yield of 2-fluoromethylcyclohexenylmethyl methyl sulfone is obtained.

Example XI

When the procedure of Example II is employed to react ethanesulfonyl chloride with 3-vinyl-3,6-dihydro-2H-pyran in dioxane solution in the presence of cuprous chloride catalyst, a good yield of 3-(2-chloroethylidine)-5,6-dihydro-2-pyranyl methyl sulfone is obtained.

Example XII

A good yield of 2,3,4-trichloro-2-butenyl methyl sulfone is obtained when methanesulfonyl chloride is reacted with 2,3-dichloro-1,3-butadiene in acetonitrile solution in the presence of cuprous chloride as catalyst.

We claim as our invention:

1. The compound

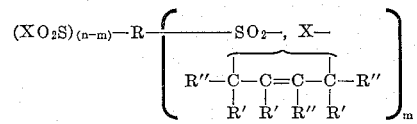

wherein R is a mono- to n-valent organic radical having up to 40 carbon atoms, n is a whole number from 1 to 6 inclusive, m is a whole number from 1 to n inclusive, X is halogen of atomic number from 17 to 35, and R' and R'' are independently selected from the group consisting of hydrogen, aliphatic and aromatic radicals with the proviso that R'' and R' may together form a divalent radical having up to 8 carbon atoms, said divalent radical together with the carbon-containing moiety to which it is attached forming a carbocyclic ring.

2. The compound of claim 1 wherein $n=m$.

3. Aliphatic mono- to tri-4-halo-2-butenyl sulfone wherein the aliphatic moiety has from 1 to 10 carbon atoms and each halo moiety is halogen of atomic number from 17 to 35.

4. The compound of claim 3 wherein the halogen is chlorine.

5. Methyl 4-chloro-2-butenyl sulfone.

6. Aromatic mono- to tri-4-halo-2-butenyl sulfone wherein the aromatic moiety is mono- to dinuclear of from 6 to 10 carbon atoms and each halo moiety is halogen of atomic number from 17 to 35.

7. Phenyl 4-chloro-2-butenyl sulfone.

8. 1,3-bis(4-chloro-2-butenylsulfonyl) benzene.

9. The process for the production of δ-halo-β-alkenyl sulfones by the 1,4-addition of an organic sulfonyl halide of up to 40 carbon atoms and from 1 to 6 sulfonyl halide substituents wherein the halogen has an atomic number from 17 to 35 to a conjugated diene compound in the presence of a catalystic amount of a copper salt.

10. The process of claim 9 wherein the copper salt is copper halide.

11. The process for the production of δ-halo-β-alkenyl sulfones by the 1,4-addition of an organic sulfonyl halide wherein the organic moiety has from 1 to 20 carbon atoms and has from 1 to 3 sulfonyl halide substituents wherein the halogen has an atomic number from 17 to 35 and is selected from the group consisting of aliphatic radicals and mononuclear aromatic radicals, to a conjugated diene compound selected from the group consisting of acyclic diene compound having from 4 to 10 carbon atoms and carbocyclic diene compound having from 5 to 10 carbon atoms in the presence of a catalytic amount of a copper salt as catalyst.

12. The process of claim 11 wherein the sulfonyl halide is a sulfonyl chloride.

13. The process of claim 11 wherein the sulfonyl halide is sulfonyl bromide.

14. The process for the production of alkyl δ-halo-β-alkenyl sulfones by the 1,4-addition of an alkanesulfonyl chloride to conjugated hydrocarbon acyclic diene having from 4 to 8 carbon atoms in the presence of a catalytic amount of copper chloride as catalyst.

15. The process of claim 14 wherein the conjugated diene is butadiene.

16. The process of claim 14 wherein the conjugated diene is isoprene.

17. The process of claim 14 wherein the alkanesulfonyl chloride is methanesulfonyl chloride.

18. The process for the production of aromatic δ-halo-β-alkenyl sulfones by the 1,4-addition of a mononuclear aromatic sulfonyl chloride having from 6 to 10 carbon atoms to a conjugated hydrocarbon acyclic diene having from 4 to 8 carbon atoms in the presence of a catalytic amount of copper chloride as catalyst.

No references cited.

CHARLES B. PARKER, *Primary Examiner.*

DELBERT R. PHILLIPS, *Assistant Examiner.*